United States Patent

Downer et al.

[15] 3,661,550
[45] May 9, 1972

[54] PROCESS FOR MAKING MICRONUTRIENT NAPHTHENATE COMPOSITIONS

[72] Inventors: John D. Downer; C. Loyal W. Swanson, both of Trinidad

[73] Assignee: Texaco Trinidad, Inc., Pointe-a-Pierre, Trinidad

[22] Filed: Aug. 22, 1969

[21] Appl. No.: 852,470

[52] U.S. Cl. ..................................................71/27, 71/1
[51] Int. Cl. ..................................................C05f 11/00
[58] Field of Search................71/1, 11, 27, 64 F; 260/514 N; 424/356

[56] References Cited

UNITED STATES PATENTS

| | | | |
|---|---|---|---|
| 2,001,108 | 5/1935 | Parker | 252/37.7 |
| 2,570,023 | 10/1951 | Carlson et al. | 424/356 |
| 3,064,019 | 11/1962 | Pauli et al. | 260/514 N |
| 3,138,896 | 6/1964 | Millikan | 424/356 |
| 3,192,032 | 6/1965 | Thomas | 71/64 F |
| 3,222,275 | 12/1965 | Krewer et al. | 260/514 N |
| 3,332,971 | 7/1967 | Elder et al. | 260/514 N X |

OTHER PUBLICATIONS

Gregory– Uses & Applications of Chemicals & Related Materials– 1944– pages 86 & 350– Reinhold Publishing Corp., New York Pirone– Tree Maintenance– 1959– page 64– Oxford University Press, New York– (SB 761 P6)

*Primary Examiner*—Reuben Friedman
*Assistant Examiner*—Bennett H. Levenson
*Attorney*—K. E. Kavanagh and Thomas H. Whaley

[57] ABSTRACT

A micronutrient composition intended for application to the foliage, branches or barks of plants is described as containing oil soluble calcium, copper, molybdenum, magnesium, zinc, manganese or iron naphthenates of higher molecular weight in a horticultural spray oil. The naphthenic acids composition is made by mixing a solution of naphthenic acids in a light aromatic solvent with an aqueous sodium hydroxide solution to form sodium naphthenate, then adding an additional amount of solvent; heating and reacting with an aqueous solution of a water soluble salt of one of the above mentioned metals; separating the organic layer from the aqueous layer; washing the organic layer with water and then adding to the organic layer the quantity of spray oil required to obtain a composition having the desired concentration and removing substantially all of the light aromatic solvent so that the spray oil remains non-phytotoxic.

3 Claims, No Drawings

PROCESS FOR MAKING MICRONUTRIENT NAPHTHENATE COMPOSITIONS

This invention is concerned with plant nutrition and in particular with the provision of oil soluble naphthenic acid derivatives for supplying elements essential to plant growth.

Calcium, copper, molybdenum, magnesium, zinc, manganese and iron are micronutrients which are essential for plant growth. When these are absent from an area to be cultivated, they are usually supplied by addition to the soil.

However, the contour of the terrain, the wind conditions, the annual rainfall and the like often make such additions inefficient, impractical or costly.

Various attempts have been made to supply these essential elements in the form of micronutrients to plants through their foliage, branches or bark by means of sprays but so far as I am aware none of these attempts has proven satisfactory and efficient for the intended purpose. These sprays were unsuccessful mainly because they consisted of aqueous solutions or suspension or because the solutions were phytotoxic at practical dilutions. Aqueous media are not very resistant to weathering with the result that the micronutrients contained in the sprays were washed away by the rain or swept away by the wind before they were assimilated by the plants.

With a view to departing from prior art techniques the main object of my invention accordingly is to provide compositions containing oil soluble naphthenates of trace elements needed for plant growth.

An equally important object of my invention is to provide a process for making oil soluble naphthenates of such elements.

As distinguished from prior art compositions, the compositions herein sought to be patented comprise oil soluble naphthenates of calcium, copper, molybdenum, magnesium, zinc, manganese and iron dissolved in a horticultural spray oil.

In its process aspect, the invention resides in a process for making oil soluble naphthenates of calcium, copper, molybdenum, magnesium, zinc, manganese, and iron, by mixing naphthenic acids dissolved in a light aromatic solvent with an aqueous solution of sodium hydroxide to form the sodium naphthenate, the free naphthenic acid contained therein being below 0.5 percent; adding an excess of the aromatic solvent; heating the mixture below boiling; treating with an aqueous solution of a water soluble salt of the desired metal: separating the organic layer from the aqueous layer and washing the organic layer with water. The sulphates of copper, molybdenum, magnesium, zinc, manganese, and iron are soluble in water and hence useful in the present invention. Calcium sulphate is relatively insoluble in water but other salts of calcium such as its water-soluble halides can be used. The product thus obtained is an oil soluble naphthenate and there may be added to it the quantity of spray oil required to obtain a composition having the required concentration. Substantially complete removal of the solvent is then effected to avoid phytotoxicity.

The naphthenates of each element may be prepared separately and then combined prior to adding the spray oil or else stoichiometric amounts of the sulfate of the named elements may jointly be reacted with the sodium naphthenate.

In using spray oils on plants, a major consideration is the phytotoxic action of the oil on the plant. Oils which contain more than a certain percentage of aromatics as expressed by the unsulfonatable residue are phytotoxic.

The oil soluble naphthenates prepared in accordance with the present process are soluble in horticultural spray oils which can be characterized as non-phytotoxic hydrocarbon mineral oils, the aromatic content thereof being below about 15 percent by weight having a boiling point range between about 600° and 775° F., and a viscosity of between about 60 and 85 SUS (Saybolt Universal Seconds). Optimum results have been obtained with compositions in which the hydrocarbon solvent has a gravity API (American Petroleum Institute) of 27 to 35, an aromatics content below about 15 percent by weight, and a viscosity SUS (Saybolt Universal Seconds) at 100° F. of 70–104, preferably about 75 to 100 SSU. It will be noted by those skilled in this art that at least some of the oils encompassed by the above definitions have pesticidal acaricidal, insecticidal, vimicidal and/or fungicidal activities and that such properties are retained in the claimed compositions which contain such oils. Accordingly, these compositions have multiple effects.

The naphthenic acids used as starting materials herein are higher molecular weight aliphatic cyclic hydrocarbon carboxylic acids that are usually obtained by treating a naphthenic crude oil or fractions thereof with a caustic solution to form naphthenates that are soluble in aqueous solution. Such acids are described in greater detail in Kirk-Othmer, "Encyclopedia of Chemical Technology," Interscience Encyclopedia Co., 1952, Vol. 9, starting at page 241.

These acids have a molecular weight in the range of 200 to 600 and preferably 550. For best results, the acids should be deoiled and distilled in customary fashion prior to use. The present compositions can be applied to the leaves, branches or barks of plants by means of knapsack mistblowers and heavy portable sprayers. As required by the terrain, there may be used instead fixed winged airplanes or helicopters equipped with Micronair (rotary atomizer manufactured by Britten-Norman, Ltd., England) or boom type sprayers. Naturally, better distribution of the oil and lower cost of application are obtained by air spraying. The application rate of the composition may range from 0.7 to 5 gallons per acre whether the composition is applied by air or ground spraying. The amount of oil remaining on the plants can vary greatly according to the type of sprayer and the properties of the oil used. With an air pressure sprayer adjusted to a given discharge rate, the weight of the deposit will vary inversely with the viscosity of the oils used. In low volume sprayers, a reduction in viscosity means a greater rate of discharge or an increase in droplet size and either may give poor distribution of spray. The objective of the application is to spray the minimum quantity of the oil composition over the entire surface of the leaf, branch or bark. A suitable droplet size is of about 80 microns but this size can be within the range of 50 to 100 microns. A desirable density is one of about 32 droplets per $cm^2$. Spraying is preferably done in the early morning hours when the weather is calm in order to minimize drifting of the oil spray.

The following examples are intended to illustrate but not limit the invention.

EXAMPLE 1

588 g of Deoiled, distilled naphthenic acids (acid value, 250 mg. KOH/g) were stirred with 780 ml of benzene, 93.6 g of sodium hydroxide and 3.5 liters of water for 30 minutes at room temperature. More benzene (9 liters) was added to provide excess solvent therein and the mixture heated to 60° C. Zinc sulphate (192 g) or manganese sulfate (180 g) dissolved in 1.7 liters of water was then added and stirred for 30 minutes at 60° C. The aqueous phase was removed, the benzene solution was washed with water and a quantity of spray oil having the properties shown in Table 1 below was added according to the ultimate concentration required. The benzene was removed by distillation to leave a solution of the metal naphthenate in spray oil. Analysis of the two solutions prepared in this manner are given below in Table II.

TABLE I

Analysis of Oil Used With Naphthenates

| | |
|---|---|
| R.S. No. (Sulfonatable residue No. | 1200/67 |
| Sp. Gravity at 88°F. | 0.8390 |
| at 60°F. | 0.8493 |
| API (American Petroleum Institute) Gravity | 35.1 |
| Flash Point COC (Cleveland Open Cup) | 39.5 |
| Viscosity Saybolt Universal Seconds/100°F. | 84.2 |
| Colour, Say./NPA (Saybolt/National Petroleum Association) | 0.5 |
| Pour Point, °F. | 5 |
| Neutralization No. | 0.04 |
| Distillation, initial boiling point °C. | 336 |
| 10% | 357 |

| | |
|---|---|
| 50% | 369 |
| 90% | 387 |
| final boiling point | 396 |
| Aromatics | 10.7 |
| Ash, % wt. | 0.001 |
| Unsulphonatable Residue, % | 94.2 |

TABLE II

| Salt | Manganese Naphthenate | Zinc Naphthenate |
|---|---|---|
| (a) RS number (sulfonatable residue) | 1046/67 | 1045/67 |
| (b) Volume in liters | 15.5 | 22.2 |
| (c) Zinc or manganese gram/100 ml | 1.58[1] | 1.90[2] |
| (d) Zinc or manganese naphthenate g/100 ml (based on (c)) | 16.0 | 16.5 |
| (e) Zinc or manganese naphthenate g/100 ml (titration with standard HCl to methylorange end point) | 16.6 | 16.4 |

(1) Determined gravimetrically by conversion to manganese pyrophosphate.
(2) By titration with potassium ferrocyanide according to Vogel's "Textbook of Quantitative Inorganic Analysis", Longmans.

Results with zinc naphthenate (Table III) derived from naphthenic acids of acid value 250, indicate that although the metal is assimilated the solution is phytotoxic at practical dilutions. This was thought to be due, at least in part, to the presence of free naphthenic acids on the leaf surface; indeed solutions of 0.5–5 percent free naphthenic acids (nominal acid value 230) in spray oil were shown to be phytotoxic (Table IV), and the free naphthenic acids in the naphthenate solution should desirably be below 0.5 percent. The formation of this free naphthenic acid might be minimized by use of a higher molecular weight naphthenate, since this would be more hydrophobic and less readily hydrolyzed. Example 2 which follows describes the preparation of such a naphthenate. The results of leaf burn tests carried out with this higher molecular weight naphthenate are given in Table IV., and show that at 1 percent metal content leaf burn is practically eliminated with the higher molecular weight naphthenates.

It should be noted that solutions of the neutral zinc and manganese naphthenates in oil have also been prepared by reaction of the metal oxides with the naphthenic acids (see G.M. Fisher, U.S.P. 2,071,862/37; Chem. Abs., 1937, 31, 2617[6]). Example 3, which follows describes such a preparation using manganese dioxide.

EXAMPLE 2

Naphthenic acids (98 g, acid value 112 mg.KOH/g were stirred with benzene or toluene (50 ml), sodium hydroxide (7.8 g) and water (325 ml) for 30 min. at 30° C. More benzene or toluene (800 ml) was added and the mixture heated to 60° C. Zinc sulphate (15.7 g), or manganese sulphate (14.4 g), dissolved in water (150 ml) was then added and stirred for 30 minutes at 60° C. The mixture was cooled to room temperature and the aqueous layer removed. The benzene or toluene solution was washed with the corresponding metal sulphate solution, twice with water, and then analyzed for metal content [by titration with standard potassium ferrocyanide solution in the presence of sulphuric acid and ammonium sulphate using diphenylbenzidine indicator (Vogel's "Textbook of Quantitative Inorganic Analysis" p. 463, Longmans). Manganese was determined gravimetrically as $MnNH_4PO_4 \cdot H_2O$ (Vogel, loc. cit. p. 554).], and for naphthenate by titration with hydrochloric acid to methylorange end point. Zinc content was 0.022 equilvanets/100 ml with a corresponding naphthenate content of 0.024 equivalents/100 ml. The manganese and corresponding naphthenate concentrations were both 0.024 equivalents/100 ml. Spray oil (200 ml) having the properties shown in Table I was added to the benzene or toluene solution, the solvent removed by distillation, analyzed and diluted to give solutions containing 1 g metal /100 ml.

EXAMPLE 3

Manganese dioxide (64.2 g.) and naphthenic acid (258 g, acid value 250 mg KOH/g) were heated to 140° in a three-necked flask with stirring and under a stream of nitrogen. The reaction was stopped when no more water appeared in the effluent gases (23.2 ml of water were collected in all). Spray oil having the properties shown in Table 1 was added according to the ultimate concentration required, the mixture filtered, and analyzed. The product corresponded to the neutral naphthenate.

TABLE III

Neutral Zinc Naphthenate in Spray Oil[1]: Leaf Burn Tests

| % Zinc | Leaf burn |
|---|---|
| 1.0–0.5 | Very severe |
| 0.4–0.2 | Severe |
| 0.1 | Slight |
| 0.05 | Very slight |
| 0.01 | None |

(1) Spray oil having properties shown in Table I.

TABLE IV

Neutral Metal Naphthenates in Spray Oil[1] (1% Metal Content): Leaf Burn Tests

| Naphthenate | Leaf burn (Grapefruit) |
|---|---|
| Zinc (250)[2] | Severe |
| Manganese (250)[2] | Severe |
| Zinc (112) | None |
| Manganese (112) | None |
| 0.5% Naphthenic acids (250) | Very slight |
| 5% Naphthenic acids (250) | Severe |
| Spray oil[1] alone | None |

(1) Spray oil having properties shown in Table I
(2) Acid value of naphthenic acids used In the same manner, mixtures of the naphthenates of manganese, zinc, copper, molybdenum, calcium, magnesium and iron are prepared.

It will be obvious to those skilled in the art that potassium naphthenate can be prepared directly by using potassium hydroxide instead of sodium hydroxide.

The light aromatic solvent used as the solvent herein can be any which is a liquid with a low viscosity at ordinary room temperature. Such hydrocarbons include benzene, toluene, or xylene, and, generally, aromatic solvents boiling up to about 300° F. provided their viscosity is not too high. Naturally, the quantity of solvent to be used will be determined by the solubility of the naphthenic acids used.

What is claimed is:

1. A process for preparing a micronutrient composition comprising an oil soluble naphthenate of a metal selected from the group consisting of molybdenum, copper, calcium, magnesium, zinc, manganese and iron comprising mixing a solution of naphthenic acids obtained from a naphthenic crude oil, said acids consisting of higher molecular weight aliphatic cyclic hydrocarbon carboxylic acids having a molecular weight ranging from about 200 to about 600, in a light aromatic solvent of low viscosity having a boiling point ranging up to 300° F. with an aqueous solution of sodium hydroxide to form sodium naphthenate, the free naphthenic acid content therein being below 0.5 percent; adding excess solvent to the thus formed mixture; heating said mixture to below its boiling point and reacting therewith an aqueous solution of a metal sulfate selected from the group consisting of molybdenum, copper, magnesium, zinc, manganese and iron or an aqueous solution of a water-soluble calcium halide to form an aqueous layer and an organic layer containing the desired oil-soluble metal naphthenate, the metal content being below that causing leaf burn; separating said organic layer from said aqueous layer, washing said organic layer with water; mixing therewith a horticultural spray oil comprising a non-phytotoxic hydrocarbon mineral oil having a gravity API of 27–35 and a viscosity at 100° F. of 70 to 104 Saybolt Universal Seconds and a boiling point range between about 600° and 775° F.; and removing substantially all of said light aromatic hydrocarbon solvent from the resulting mixture.

2. A process according to claim 1 wherein a mixture containing at least two water soluble salts selected from the group consisting of copper, molybdenum, magnesium, zinc, manganese and iron sulfates is reacted with said sodium naphthenate.

3. A process for supplying essential elements to plants comprising air spraying the leaves, branches or barks of said plants with from about 0.7 to about 5 gallons per acre of a composition prepared by the process of claim 1.

* * * * *